United States Patent
Davis, Jr.

[11] 3,819,316
[45] June 25, 1974

[54] PIE CRUST FORM
[76] Inventor: George B. Davis, Jr., 7512 Marbury Rd., Bethesda, Md. 20658
[22] Filed: Nov. 17, 1972
[21] Appl. No.: 307,535

[52] U.S. Cl. .................................. 425/470, 229/66
[51] Int. Cl. ............................................. A23p 1/00
[58] Field of Search.. 99/92, 172; 206/46 F, 56 AA, 206/56 R; 229/66, 51 AS; 425/470, 89

[56] References Cited
UNITED STATES PATENTS
2,744,475  5/1956  Ayres .................................. 425/470
2,745,754  5/1956  Steinbock ....................... 221/51 AS
3,194,185  7/1965  Spinosa .............................. 229/66

Primary Examiner—William T. Dixson, Jr.

[57] ABSTRACT

This invention relates to a pie crust forming or working device and particularly to an inexpensive disposable type of such device designed primarily for inclosing within the container of a conventional pie crust mix and which will enable even the most novice of pie crust makers to produce in a matter of minutes a perfect crust both as to diameter and thickness without the usual cleanup mess that accompanies the crust rolling operation.

7 Claims, 2 Drawing Figures

PIE CRUST FORM

The making of a pie is a comparatively simple task, however, the difficulty of rolling the pie crust dough is so frustrating and messy to the average person, that making of homemade pies are becoming a thing of the past. Although pie crust can now be bought preformed and frozen, the high cost and the cost of the pie filling makes it actually cheaper to buy ready baked pies regardless of quality. This condition has been brought about solely because of the difficulty of rolling the crust.

Generally, cookbooks suggest that the crust dough be rolled between pieces of waxed paper and which greatly helps, however, it is far from a solution to the problem. The edges are always uneven and must be trimmed off or rearranged and any extra dough so placed as to fill in the thin spots in the crust. Invariably there is extra or remaining dough after the pie crust has been arranged within and over the pan.

Further, when the average person attempts to make pie crust dough, more water is frequently added to the dough than is called for in the recipe in order to produce a consistency suitable for rolling. This adding of extra water, according to the cookbooks "can result in a tough and nonflakey crust." Further, because of the additional handling of the dough during the rolling, patching and rearranging operations, the quality of the finished product is further reduced.

With the use of the present device the crust dough can be mixed exactly in accordance with the recipe and regardless of how crumbly or dry when balled and placed within the form and rolled, will consistently result in a smooth, uniformly thick crust that is easily handled and will invariably be tender and flakey.

It is an object of the present invention to provide a simple disposable pie crust form that will enable even the most inexperienced cook to easily prepare a crust that will be uniform in thickness and of a diameter exactly fitting the pie pan. If so desired, two sizes of forms may be provided, a larger one for the bottom crust and a smaller one for the top crust. There will be no waste whatever, since in all instances the diameter of the form and quantity of dough will automatically determine the crust thickness.

It is a further object of the present invention to provide a disposable pie crust form that is preferably transparent, thereby allowing the preparer to observe the direction the dough should be rolled to properly fill the form with the minimum of rolling effort.

A still further object is to provide a disposable pie crust form that will result in a uniformly shaped and uniformly thick crust regardless, within reason, of the quantity of dough used within the form.

A further object is to provide a pie crust form wherein the material and sealed edges of the form are sufficiently strong as to prevent rupture as the dough is pressed evenly throughout the form during the rolling operation.

The present device may be more readily understood by now referring to the accompanying drawings wherein.

Figure 1:
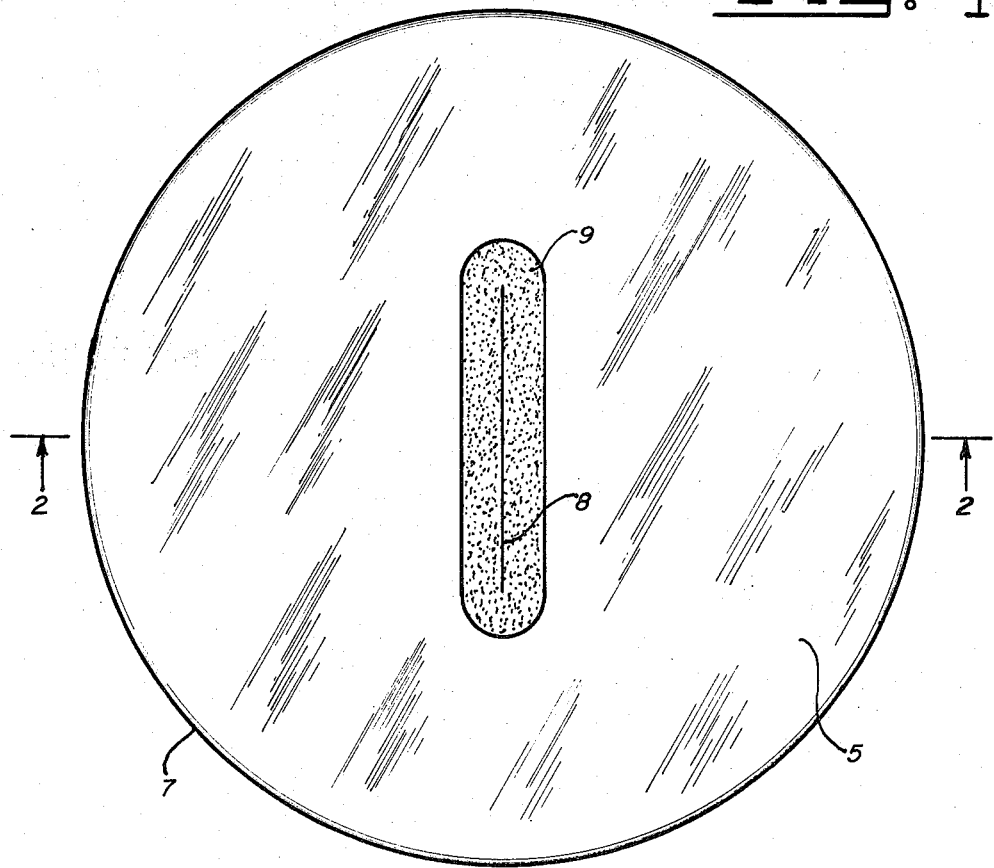
FIG. 1 is a plan view of the device showing the slot within the top layer of the form and wherein the dough-ball is inserted for subsequent rolling.
Figure 2:
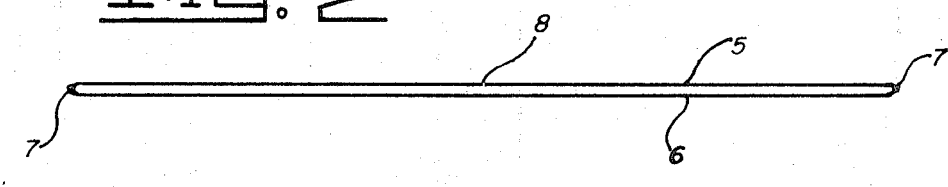
FIG. 2 is a sectional view through the device as taken along line 2—2 of FIG. 1.

Referring now to FIGS. 1 and 2, the device of the present invention is comprised of two circular or otherwise formed preferably transparent plastic sheets 5 and 6 which have been heat-sealed or otherwise secured along their outer edges 7. Within the surface of one of the sheets as at 8 is formed an elongated slot through which prepared dough is inserted for being subsequently rolled into a pie crust form. Location of the slot is made easy by any suitable marking printed about the slot as shown. The slot is shown as an unsealed opening within one of the plastic sheets, however, it is understood that it may be closed after insertion of the dough in any suitable manner as by a tape strip, however, dough will not extrude through this slot during the rolling operation so closing of the slot is actually not necessary.

After the dough-ball has been inserted through the slot and into the form, the form is then placed slotted side down upon any suitable smooth surface. The dough-ball is first pressed substantially flat with the roller before the rolling process begins. By using a transparent material for the form, the operater can easily see the direction the dough is flowing as it is rolled, thereby, to more easily and quickly fill the form to a uniform thickness. A few extra firm rolling strokes over the form after the dough has completely filled the form will assure a dense, easily handled crust of the thickness and diameter desired. The crust can be removed from the form by cutting the form apart by using a razor, knife, or the like. The bottom layer of the form, upon which the pie crust now rests, after the top layer of the form has been removed, will support the crust as it is rolled up and unrolled, crust down, over the pie pan during the arrangement of the crust to the position desired. The final operation is to lift the last remaining plastic layer of the form from the crust after the crust is in final position within the pan or over the pie as the case may be.

While the device herein is described as being constructed from transparent plastic, it is understood that certain wax treated material would also suffice. The transparency and strength of the plastic would cost less, as well as, functionally, be far superior to any other form of material that could be used. Since the pressure upon the sealed edges of the form during the rolling operation is considerable, it is imperative that the seal along the deges of the form be of a quality to withstand these pressures.

While the form shown is of a round configeration, a square, or rectangular form can be used when it is desired to make a crust for cobblers or meat pies which are generally cooked in square or rectangular pans.

If a stickey dough is required by certain recipes, the inner surfaces of the form may be sprayed or otherwise treated with any one of the many releases on the market to permit the form to be easily removed from the dough after rolling.

While one and the simplest forms of the invention is herein described and shown, it is understood that more complicated modifications may be incorporated therein without increasing its effectiveness or purpose.

What I therefore claim and desire to cover by letters patent is:

1. A device for the working of pie crust dough into pie crust form comprising two thinly formed sheets of flexible material at least one of said sheets being transparent, said sheets being juxtiposed one against the other and permanently secured together at their outer edges, a slot formed opening within one of said sheets and positioned inwardly in spaced relation to said sealed edges to prevent the dough from extruding through the slot for admitting pie crust dough between said sheets.

2. The device of claim 1 wherein both said sheets of flexible material are transparent.

3. The device of claim 1 wherein the opening within one of said sheets is in the form of an elongated slot.

4. A device for the making of pie crust dough into pie crust form comprising two circular sheets of flexible transparent material juxtiposed one against the other and sealed together about their outer edges into a waffer-like assembly and an elongated slot formed within the surface of one of said circular sheets and spaced inwardly from said sealed edges to prevent the dough from extruding through the slot for admitting the pie crust dough between the surfaces of said sheets.

5. A device as claimed in claim 4 wherein the circular sheets are of transparent plastic and heat sealed along their edges.

6. A device as claimed in claim 4 wherein means are provided for closing said slot.

7. A device as claimed in claim 6 wherein the means for closing said slot is in the form of an adhesive strip.

* * * * *